United States Patent [19]

Cronauer et al.

[11] 4,350,609
[45] Sep. 21, 1982

[54] PROCESS FOR PRODUCING A CATALYST BY DEPOSITING MOLYBDENUM REMOVED FROM A WASTE CATALYST

[75] Inventors: Donald C. Cronauer, Gibsonia, Pa.; Robert B. Bjorklund, Linkoping, Sweden

[73] Assignee: Gulf Research & Development Company, Pittsburgh, Pa.

[21] Appl. No.: 238,538

[22] Filed: Feb. 26, 1981

[51] Int. Cl.$^3$ .............................................. B01J 23/28
[52] U.S. Cl. .................................. 252/465; 252/415; 252/458; 423/60
[58] Field of Search .................. 423/59, 60, 462, 472; 252/415, 465, 458

[56] References Cited

U.S. PATENT DOCUMENTS

| | | | |
|---|---|---|---|
| 2,367,263 | 1/1945 | Brown | 252/465 |
| 3,180,706 | 4/1965 | Erickson | 423/60 |
| 3,406,007 | 10/1968 | Van Den Steen et al. | 423/60 |
| 3,432,255 | 3/1969 | Long et al. | 423/60 |
| 4,182,747 | 1/1980 | Gravey et al. | 423/491 X |

FOREIGN PATENT DOCUMENTS 17285 10/1980 European Pat. Off. ............ 252/415

Primary Examiner—Earl C. Thomas
Attorney, Agent, or Firm—Deane E. Keith; Forrest D. Stine; Joseph J. Carducci

[57] ABSTRACT

This invention relates to a method for selectively removing molybdenum values from a spent catalyst and producing a fresh molybdenum-containing catalyst. Such a method preferably contacts anhydrous gaseous hydrogen chloride at an elevated temperature with the metal containing catalyst which is substantially free of carbonaceous material to selectively remove molybdenum therefrom, and producing a fresh molybdenum-containing catalyst by depositing molybdenum from the vapor phase onto a fresh support in the presence of air. At least 50 weight percent and generally as much as 95 weight percent of the molybdenum is removed while other metals such as iron, titanium, cobalt and nickel along with the supporting alumina or silica are not affected.

12 Claims, No Drawings

PROCESS FOR PRODUCING A CATALYST BY DEPOSITING MOLYBDENUM REMOVED FROM A WASTE CATALYST

This invention relates to a process for selectively removing molybdenum from a catalyst and producing a fresh molybdenum-containing catalyst. More specifically such a process comprises contacting a molybdenum containing catalyst with anhydrous gaseous hydrogen chloride at an elevated temperature to selectively remove molybdenum therefrom, and producing a fresh molybdenum-containing catalyst by depositing molybdenum from the vapor phase onto a fresh support in the presence of air.

Catalysts containing molybdenum are well known, especially for use as hydrocarbon conversion catalysts. Such catalysts find particular use in hydrogenation processes, such as hydrodesulfurization and coal liquifaction. Such catalysts are becoming increasingly important in the conversion of coal to a liquid by hydrogenation. These catalysts generally comprise molybdenum in combination with one or more transition metals, particularly the group VIII metals, such as nickel and cobalt and are often supported on alumina.

Such catalysts, after considerable use, eventually lose their effectiveness. Spent catalysts may be calcined, e.g., at temperatures of about 300° C. to about 650° C. and ambient pressures, to remove contaminants, particularly carbon. Iron and titanium accumulated on the surface of the catalyst during use will remain after calcination.

These calcined catalysts may contain between about zero and about ten weight percent each cobalt and nickel and between about a half and about twenty weight percent each titanium, molybdenum and iron. Generally, these catalysts contain between about zero and about five weight percent each cobalt and nickel, between about one and about fifteen weight percent each titanium or iron and between about five and about fifteen weight percent molybdenum. It is believed that these metals are present on the spent, calcined catalyst in the form of oxides or sulphates, although the weight percent figures above have been given based upon the metals in their elemental state.

The catalyst support may be alumina, silica, alumina-silica combinations, other aluminum or silicon salts and the like. Generally, the support is alumina in its gamma, eta, or delta forms.

Prior art methods of removing molybdenum from waste catalysts suffer from the disadvantage of also removing other metals present. Gravey, et al. disclose in U.S. Pat. No. 4,182,747 a method for preparing anhydrous metallic chlorides from waste catalysts. This method removes molybdenum by chlorination of the waste catalyst at temperatures of 500° C. to 600° C., preferably in the presence of carbon or sulfur. In addition to molybdenum, other metals which form low boiling temperature metal chlorides such as aluminum and vanadium are removed.

French Pat. No. 724,905 discloses a process for extracting molybdenum, tungsten and vanadium from certain minerals. This process involves chlorination of the metals with gaseous chlorine or hydrogen chloride at temperatures below 400° C. in the presence of carbonaceous materials. The metal chlorides may be recovered from the vapors. Again, molybdenum is not selectively removed.

Erickson discloses in U.S. Pat. No. 3,180,706 a method of removing metal values, such as molybdenum, from a spent hydrocarbon conversion catalyst. This method involves several steps and several oxygenating, sulfiding and chlorinating gases.

This method requires the initial treatment of the spent catalyst with a molecular oxygen containing gas at temperatures of 1050° F. (565° C.) to greater than 1800° F. (982° C.) to raise the molybdenum to its highest valence state. The oxygen-treated catalyst is then sulfided by contact with sulfiding vapors at a temperatures of 500° F. (260° C.) to 1600° F. (871° C.). Finally, the sulfided catalyst is chlorinated by contact with a chlorinating mixture at temperatures of 300° F. (149° C.) to greater than 1500° F. (815° C.).

This method requires the use of a multi-component gaseous chlorinating mixture. One component of this mixture must be molecular chlorine or hydrogen chloride while the other component must be a vaporizable carbon or sulfur compound of chlorine.

The prior art methods of removing molybdenum values thus do not provide selective removal of molybdenum in the presence of other metals capable of forming chlorides with low boiling points. Further, other prior art methods are multi-step processes requiring the use of several different reaction gases, e.g. different gases to oxygenate, to sulfide and to chlorinate the metals to be removed.

SUMMARY OF THE INVENTION

The present invention provides a simple, single step method to remove substantially all of the molybdenum values from spent catalysts without simultaneously removing substantial quantities of the other metals present. This method is particularly useful for the treatment of waste hydrogenation catalysts used to convert coal to a liquid. Such removal is accomplished by contacting the spent catalyst with a chlorinating agent, preferably anhydrous gaseous hydrogen chloride, at an elevated temperature.

Preferably, the catalyst has been first calcined at about 300° C. to about 650° C. to remove contaminants, particularly carbon. In addition to molybdenum, the spent catalysts will often contain other transition metals, such as iron, titanium, cobalt and nickel on an active support such as alumina, silica or the like.

A chlorinating agent, such as chlorine or hydrogen chloride, is contacted with the spent catalyst at elevated temperatures. Anhydrous gaseous hydrogen chloride is preferred as the chlorinating agent. Preferably anhydrous gaseous hydrogen chloride is contacted with the catalyst while maintaining the catalyst at a temperature of from about 100° C. to about 600° C., preferably from about 400° C. to about 575° C. Although reaction at atmospheric pressure is currently believed preferable, pressures as high as about 1000 pounds per square inch gauge (psig) (6.9 MPa) or even higher may be used. The space velocity (volume of chlorinating gas per hour per volume of catalyst) of chlorinating gas may be between about 10 and about 4000, preferably between about 50 and about 3000.

It is believed that the molybdenum present on the catalyst is converted to molybdenum oxychlorides. Molybdenum values are believed to be removed from the catalyst in the form of gaseous molybdenum oxychloride as $MoO_2Cl_2$. These molybdenum values may be recovered from the gaseous effluent by any convenient method known to the art.

The method of the present invention will remove at least about 50 weight percent and generally from about 50 to about 95 weight percent of the original molybdenum from the catalyst surface. No appreciable amount of the remaining metals, nor any appreciable portion of the alumina support is removed. The method of the present invention permits the removed molybdenum to be deposited on fresh support to provide a fresh catalyst precursor.

The method of the present invention thus provides a means of selectively removing and recovering the molybdenum values from spent catalysts comprising other metals, including other transition metals. These and other meritorious features and advantages of the method of the present invention will be more fully appreciated from the following detailed description and claims.

DESCRIPTION OF THE PREFERRED EMBODIMENT

The present invention provides a method for selectively removing molybdenum values from spent catalysts which may comprise other metals, including other transition metals, in addition to molybdenum. This method is particularly useful for the selective removal of molybdenum from waste hydrogenation catalysts used to convert coal to a liquid. Such catalysts may often contain iron, titanium, cobalt and nickel in addition to molybdenum. These catalysts are also often supported on a base of active alumina, silica or the like. Such selective removal is accomplished by contacting a chlorinating gas, such as chlorine or gaseous hydrogen chloride with the spent catalyst at an elevated temperature. Anhydrous gaseous hydrogen chloride is the preferred chlorinating agent. The temperature of the spent catalyst is maintained in the range of about 100° C. to about 600° C. while the chlorinating agent, preferably anhydrous gaseous hydrogen chloride, is passed over it.

It is preferred that contaminants, particularly carbon, be removed from the spent catalysts prior to selective removal of molybdenum by the method of the present invention. Such removal may be accomplished by calcination of the spent catalysts. Calcination may be conducted by heating the catalysts at temperatures from about 300° C. to about 650° C. for several hours. Calcination may not be necessary as these catalysts are often free of contaminants such as carbon. Although the method of the present invention may be performed in the presence of carbon, it is believed that substantial quantities of carbon and other contaminants may affect the efficiency of the removal of molybdenum.

In the preferred embodiment of the present invention, the spent, and preferably calcined, catalyst is contacted with anhydrous gaseous hydrogen chloride at a temperature of from about 100° C. to about 600° C., preferably from about 400° C. to about 575° C. This operation may be performed by any means conventionally known to the art, e.g., in a vertical column furnace. Contact times are determined by the chlorinating gas, the operating temperature and pressure, the space velocity of the chlorinating gas, the quantity of waste catalyst and the quantity of molybdenum to be removed. As temperature, pressure and space velocity increase and the quantity of waste catalyst and quantity of molybdenum to be removed decrease, the contact times decrease. The disappearance of molybdenum from the effluent vapors indicates that the removal is complete. Such disappearance may often be detected by the disappearance of a colored, usually yellowish, vapor in the cooled effluent.

Although atmospheric pressure is presently preferred, pressures above or below one atmosphere may be used. Pressures as high as about 1000 pounds per square inch gauge (psig) (6.9 MPa) or higher may be used. The space velocity (volume of chlorinating gas per hour per volume of catalyst) of the anhydrous gaseous hydrogen chloride in the preferred embodiment may be from about 10 to about 4000, preferably from about 50 to about 3000.

Although relatively pure anhydrous gaseous hydrogen chloride is preferred as the chlorinating agent, mixtures with air or other diluent gases may be employed. Mixtures containing as much as ninety-five volume percent air with 5 volume percent anhydrous gaseous hydrogen chloride have been employed. However, the efficiency of molybdenum removal is reduced with increasing concentrations of diluent gases.

The gaseous effluent leaving the reaction zone of the furnace comprises unreacted gaseous hydrogen chloride, gaseous water and gaseous molybdenum oxychlorides, believed to be in the form of $MoO_2Cl_2$. The reaction of gaseous hydrogen chloride with molybdenum produces the effluent gaseous water.

The molybdenum values in the gaseous effluent may be recovered therefrom by any convenient conventional method known to the art. For example, the vaporous effluent may be cooled to atmospheric temperature and atmospheric pressure. Under these conditions gaseous hydrogen chloride will be flashed off while gaseous water condenses to liquid with the molybdenum oxychlorides therein. Simple filtration and evaporation is sufficient to recover the molybdenum oxychlorides in the form of $MoO_2Cl_2$. Alternatively, molybdenum may be recovered by passing the effluent vapors through a column containing potassium chloride granules. Subsequently the molybdenum chloride which becomes fixed on the potassium chloride may be recovered by known separation methods. This method of recovery of molybdenum is discussed in U.S. Pat. No. 4,182,747, column 3, line 67 to column 4, line 19.

Alternatively, the molybdenum values in the gaseous effluent may be recovered therefrom by a method which produces a fresh catalyst precursor. Such a system deposits the removed molybdenum values on fresh alumina support to produce the fresh catalyst precursor.

A gaseous mixture comprising from 1 to 50 volume percent anhydrous hydrogen chloride with 99 to 50 volume percent air, preferably 2 to 10 volume percent anhydrous hydrogen chloride with 98 to 90 volume percent air, is contacted with the spent catalyst under the above stated conditions. The gaseous effluent containing the removed molybdenum values is then contacted with fresh alumina support at a temperature from about 50° C. to about 400° C., preferably from about 100° C. to about 300° C. The volume percent of air to total gaseous mixture contacting the fresh alumina should be from about 20 to about 98, preferably from about 50 to about 95 volume percent, in order to depsit sufficient molybdenum on the fresh alumina. Under these conditions at least five weight percent and preferably about seven to twelve weight percent of molybdenum (measured as the elemental metal) will be deposited on the fresh alumina. When the molybdenum has been removed from the spent catalyst by a chlorinating gas not comprising air, sufficient air to enhance depositing of the molybdenum on the fresh aluminua may be added to the gaseous effluent prior to its contact with the fresh alumina.

The resulting catalyst precursor comprising a fresh alumina support carrying molybdenum may easily be converted to fresh catalyst. The precursor is calcined at from about 250° C. to about 600° C. to convert the deposited molybdenum to molybdenum oxide. Other catalytic components, such as small quantities of the oxides of cobalt, nickel and/or titanium, may be added to the calcined precursor using conventional procedures such as aqueous impregnation to obtain the specific catalyst desired.

The method of the present invention provides a means of recovering at least about 50 weight percent of the original molybdenum, measured as elemental molybdenum. Generally, about 50 to about 95 weight percent of the molybdenum is removed from the catalyst surface. No appreciable amount of the remaining metals, nor any appreciable portion of the alumina support, is removed from the catalyst during this treatment.

It is believed that the chlorides of the metals on the waste catalyst are formed during the method of the present invention. The boiling points of several such chlorides are given in the following table:

TABLE I

| CHLORIDE BOILING POINTS | |
|---|---|
| Compound | Temperature °C. |
| $MoCl_5$ | 268 |
| $FeCl_3$ | 315 (decomposes) |
| $TiCl_4$ | 136 |
| $MoO_2Cl_2$ | 250 |
| $CoCl_2$ | 1049 |
| $NiCl_2$ | 973 (sublimes) |
| $AlCl_3$ | 178 (sublimes) |
| $SiCl_4$ | 58 |

The above boiling points have been obtained from the *Handbook of Chemistry and Physics*, 58th Edition, CRC Press, Cleveland, Ohio (1977) and *Lange's Handbook of Chemistry*, 12th Edition, McGraw-Hill, New York, N.Y. (1979).

The selective removal of substantial percentages of only molybdenum from the waste catalyst at elevated temperatures such as 250° C. and particularly at temperatures as high as 550° C. appears surprising in view of the relatively low boiling points of the metal chlorides expected to be formed on chlorination of metals on the catalyst.

The following examples of certain embodiments of the present invention are illustrative only and are not to be construed as limiting in any way.

EXAMPLE I

The waste catalyst comprises molybdenum, cobalt, nickel, iron and titanium and is supported on commercial gamma alumina having a surface area of 200 square meters per gram at a pore volume of 0.5 cubic centimeters per gram. This catalyst has been previously calcined and is substantially free of carbon and sulfur. A compositional analysis of the catalyst is provided in TABLE II.

Four grams of this waste catalyst were loaded into a fused silica tube of 12 millimeter inner diameter, which was then placed in a furnace. The tube and catalyst were heated to 250° C. under nitrogen flowing at the rate of 220 cubic centimeters per minute. The nitrogen flow was stopped and anhydrous gaseous hydrogen chloride was flowed through the tube and catalyst at the rate of 15 cubic centimeters per minute as measured at standard temperature and pressure. At this rate the space velocity (volume of anhydrous gaseous hydrogen chloride per hour per volume of catalyst) was 128. The temperature was maintained at 250° C.

About 3 minutes after the introduction of the hydrogen chloride, yellowish vapors began to appear outside the furnace zone in that portion of the tube which was at 25° C. A yellow material soon began to condense. The flow of hydrogen chloride was continued for one hour at 250° C. Heating and the flow of hydrogen chloride were stopped. Nitrogen alone was again introduced into the tube to cool the contents of ambient temperature. The catalyst was removed from the tube and its molybdenum, iron and titanium content analyzed. This compositional analysis is summarized in TABLE II.

TABLE II

| | | | Weight of Catalyst (gm) | | Anaylsis of Catalyst (Weight %) (gms) | | | | | |
|---|---|---|---|---|---|---|---|---|---|---|
| | | | | | Before | | | After | | |
| Example | Gas | Temp (°C.) | Before | After | Mo | Fe | Ti | Mo | Fe | Ti |
| I | HCl | 250 | 4.00 | 3.90 | 8.3 (0.33) | 4.5 (0.18) | 4.0 (0.16) | 4.0 (0.15) | 5.4 (0.18) | 4.7 (0.18) |
| II | HCl:Air (5:95) | 250 | 4.00 | 3.92 | 8.3 (0.33) | 4.5 (0.18) | 4.0 (0.16) | 3.6 (0.14) | 4.4 (0.17) | 4.9 (0.19) |
| III | HCl | 550 | 4.00 | 3.65 | 8.3 (0.33) | 4.5 (0.18) | 4.0 (0.16) | 0.75 (0.03) | 4.1 (0.15) | 4.3 (0.16) |
| IV | HCl:Air (5:95) | 550 | 4.00 | 3.77 | 8.3 (0.33) | 4.5 (0.18) | 4.0 (0.16) | 3.8 (0.14) | 5.0 (0.19) | 4.4 (0.17) |

The waste catalyst initially contained 0.7 weight % (0.03 gms) of nickel and 1.4 weight % (0.06 gms) of cobalt.

The catalyst was not analyzed for nickel and cobalt after treatment, but it is believed that substantially none of these metals is removed by this process. Cobalt and nickel are not converted to low boiling temperature chlorides removable in a gas stream under these conditions.

EXAMPLE II

The conditions of Example I were duplicated in a second test with the exception that a gaseous mixture containing air and gaseous hydrogen chloride in the volume ratio 95 to 5 (air to HCl) was passed over the spent catalyst in the silica tube furnace. The same volume of hydrogen chloride was used in Example II as in Example I, necessitating a total space velocity of 2560 for the mixture of gaseous hydrogen chloride and air.

The results of Example II are shown in TABLE II.

EXAMPLE III

The conditions of Example I were duplicated in the third example with the exception that the temperature of the furnace and the catalyst was maintained at 550° C. The results are shown in TABLE II.

EXAMPLE IV

The conditions of Example IV duplicated those of Example II with the exception that the temperature of the furnace and the catalyst was maintained at 550° C. The results of Example IV are shown in TABLE II.

The examples illustrate removal of substantial quantities of molybdenum from the surface of this alumina supported waste catalyst without the removal of substantial quantities of nickel, cobalt, iron and titanium. Further, no alumina from the catalyst support appears to be lost. Molybdenum removal is 91% in Example III and 55-58% in Examples I, II and IV. While this substantial percentage of molybdenum is removed, only 0-17% of the iron is removed and 0-12% of the titanium is removed in the various examples. Although analyses for nickel and cobalt were not conducted, it may be assumed that substantially none of these metals was removed, because nickel and cobalt do not form volatile chlorides under these mild reaction conditions. Further, comparison of the catalyst weight before and after treatment indicates that little or no alumina from the support was lost (less than two percent as a maximum loss).

EXAMPLE V

A waste catalyst comprising molybdenum and iron supported on commercial gamma alumina was calcined in flowing air at 550° C. for one hour. Six grams of this catalyst were placed in the furnace and maintained at 550° C. Two grams of fresh gamma alumina were placed in the outlet zone and maintained at 250° C. A chlorinating gas comprising from about five to about ten volume percent anhydrous gaseous hydrogen chloride in air was flowed through the furnace at about 300 cc total gas/minute as measured at standard pressure and temperature.

Treatment was continued until a visible excess of molybdenum compounds was deposited downstream from the fresh alumina support bed (about thirty minutes). After cooling the waste catalyst, the fresh support (now also carrying some of the removed molybdenum compounds) and the excess molybdenum deposits were recovered and weighed. Elemental analysis of the waste catalyst and fresh support was performed by X-ray fluorescence spectroscopy. The compositional analysis of the waste catalyst before and after treatment and of the fresh alumina catalyst precursor after treatment is summarized in TABLE III. Also summarized is the quantity of molybdenum removed from the waste catalysts, the quantity deposited on the fresh gamma alumina and the quantity deposited downstream.

TABLE III
SELECTIVE TRANSPORT OF MOLYBDENUM FROM WASTE CATALYSTS TO FRESH ALUMINA

| Example | | Weight % | | | Grams Molybdenum | | |
|---|---|---|---|---|---|---|---|
| | | | | | Removed | Deposited | Downstream |
| | | Fe | Ti | Mo | | | |
| V. | 1. Waste catalyst | 0.3 | — | 7.4 | | | |
| | 2. After treatment | 0.4 | — | 2.4 | 0.30 | | |
| | 3. Fresh alumina[a] | 0.03 | — | 7.4 | | 0.14 | 0.12 |
| VI. | 1. Waste catalyst with impregnated Fe | 4.5 | — | 8.0 | | | |
| | 2. After treatment | 4.5 | — | 3.4 | 0.29 | | |
| | 3. Fresh alumina[a] | <0.05 | — | 7.7 | | 0.16 | 0.10 |
| VII. | 1. Waste catalyst with impregnated Fe and Ti | 4.5 | 5.0 | 8.0 | | | |
| | 2. After treatment | 3.9 | 4.9 | 4.3 | 0.23 | | |
| | 3. Fresh alumina[a] | <0.1 | <0.1 | 8.6 | | 0.18 | 0.10 |
| | | Fe | Ni | V | Mo | | |
| VIII. | 1. Waste catalyst | 2.8 | 3.1 | 18 | 6.0 | | |
| | 2. After treatment | 2.5 | 3.0 | 16 | 3.0 | 0.20 | |
| | 3. Fresh alumina[a] | <0.1 | — | <0.1[b] | 7.3 | | | 0.07 |
| IX. | 1. Waste catalyst | — | 0.8 | 0.6 | 7.9 | | |
| | 2. After treatment | — | 0.6 | 0.6 | 4.2 | 0.23 | |
| | 3. Fresh Alumina[a] | — | — | 0.1 | 7.2 | | 0.15 | 0.10 |

[a]Numbers are for weight % metals and gm molybdenum to fresh alumina. Sum of molybdenum deposited and molybdenum downstream should equal molybdenum removed.
[b]Vanadium deposit was at bed inlet, molybdenum was uniformly deposited on remainder of bed.

EXAMPLE VI

The conditions of Example V were duplicated in the sixth example with the exception that additional iron was impregnated on the waste catalyst. The results are shown in TABLE III.

EXAMPLE VII

The conditions of Example V were duplicated in the seventh example with the exception that additional iron and titanium were impregnated on the waste catalyst. The results are shown in TABLE III.

EXAMPLE VIII

A waste catalyst comprising molybdenum, nickel, iron and vanadium supported on commercial gamma alumina was subjected to the treatment and conditions of Example V. The results are shown in TABLE III.

EXAMPLE IX

A waste catalyst comprising molybdenum, nickel and vanadium supported on commercial gamma alumina was subjected to the treatment and conditions of Example V. The results are shown in TABLE III.

While the above is illustrative of what is now contemplated to be the best mode of carrying out the present invention, the method of selectivity removing molybdenum from a catalyst is subject to modification without departing from the spirit and scope of the invention. For example, many pressures and space velocities of anhydrous gaseous hydrogen chloride may be used with the present invention or the hydrogen chloride may be supplied in mixture with other diluent gases. Therefore, the invention is not restricted to the particular method of removal illustrated and described, but covers all modifications which may fall within the scope of the following claims. It is applicant's intention in the following claims to cover such modifications and variations as fall within the true spirit and scope of the invention.

We claim:

1. A process for producing a molybdenum-containing catalyst comprising:
   (a) selectively removing molybdenum values from a waste molybdenum-containing catalyst also comprising aluminum, silicon, iron, titanium, cobalt or nickel in a single step comprising contacting said waste catalyst with a chlorinating gas at a temperature within the range of about 100° C. to about 600° C.;
   (b) depositing molybdenum removed from said waste catalyst onto fresh alumina support by contacting the effluent gas from step (a) in the presence of air or oxygen with said fresh alumina support maintained at a temperature of about 50° C. to about 400° C.; and
   (c) calcining the product of step (b) to convert the deposited molybdenum to molybdenum oxide.

2. The process of claim 1 wherein said fresh alumina is maintained at a temperature of about 100° C. to about 300° C. and the volume ratio of air to total gaseous mixture contacting said fresh alumina is between about 20 and about 98 volume percent.

3. The process of claim 1 wherein the temperature range of the selective removal of step (a) is from about 400° C. to about 575° C.

4. The process of claim 1 wherein said waste catalyst is substantially free of carbonaceous material.

5. The process of claim 1 wherein the selective removal of step (a) occurs in the absence of air and oxygen.

6. The process of claim 1 wherein said chlorinating gas comprises anhydrous gaseous hydrogen chloride.

7. The process of claim 6 wherein the ratio of the volume of hydrogen chloride per hour to the volume of catalyst is between about 10 to about 4000.

8. The process of claim 1 wherein said fresh alumina is maintained at a temperature of about 100° C. to about 300° C.

9. The process of claim 1 wherein the volume ratio of air or oxygen to total gaseous mixture contacting said fresh alumina is between about 20 and about 98 volume percent.

10. The process of claim 1 wherein the volume ratio of air or oxygen to total gaseous mixture contacting said fresh alumina is between about 50 and about 95 volume percent.

11. A process for producing a molybdenum-containing catalyst comprising:
    (a) selectively removing molybdenum values from a waste molybdenum-containing catalyst also comprising aluminum, silicon, iron, titanium, cobalt or nickel and also being substantially free of carbonaceous material in a single step comprising contacting said waste catalyst with a chlorinating gas comprising anhydrous gaseous hydrogen chloride in the absence of air and oxygen at a temperature within the range of about 400° C. to about 575° C.; and
    (b) depositing molybdenum removed from said waste catalyst onto fresh alumina support by contacting the effluent gas from step (a) in the presence of air or oxygen with said fresh alumina support maintained at a temperature of about 100° C. to about 300° C. and wherein the volume ratio of air or oxygen to total gaseous mixture contacting said fresh alumina is between about 50 and about 95 volume percent.

12. The process of claim 11 further comprising the step of (c) calcining the product of step (b) to convert the deposited molybdenum to molybdenum oxide.

* * * * *